US009511383B2

(12) United States Patent
Drechsel

(10) Patent No.: US 9,511,383 B2
(45) Date of Patent: Dec. 6, 2016

(54) LIQUID DIFFUSER DEVICE FOR IRRIGATION SYSTEMS

(71) Applicant: Arno Drechsel, Lienz (AT)

(72) Inventor: Arno Drechsel, Lienz (AT)

( * ) Notice: Subject to any disclaimer, the term of this patent is extended or adjusted under 35 U.S.C. 154(b) by 196 days.

(21) Appl. No.: 14/152,203

(22) Filed: Jan. 10, 2014

(65) Prior Publication Data

US 2015/0115066 A1   Apr. 30, 2015

(30) Foreign Application Priority Data

Oct. 29, 2013   (IT) ................ VI2013A0265

(51) Int. Cl.
*A01G 25/02*   (2006.01)
*B05B 1/26*   (2006.01)
*B05B 3/00*   (2006.01)
*B05B 3/04*   (2006.01)

(52) U.S. Cl.
CPC ............ *B05B 1/265* (2013.01); *A01G 25/02* (2013.01); *B05B 3/008* (2013.01); *B05B 3/0486* (2013.01)

(58) Field of Classification Search
CPC ........ B05B 1/265; B05B 3/0486; B05B 3/008; B05B 1/26; A01G 25/02
USPC ...................... 239/518, 222–224, 264; 4/223
See application file for complete search history.

(56) References Cited

U.S. PATENT DOCUMENTS

| 4,660,766 A * | 4/1987 | Nelson | B05B 3/0486 188/290 |
| 4,763,839 A * | 8/1988 | Greenberg | B05B 3/0481 239/222.17 |
| 5,762,269 A * | 6/1998 | Sweet | A62C 31/02 239/392 |
| 6,199,771 B1 * | 3/2001 | Clearman | B05B 3/008 239/222.11 |
| 6,932,279 B2 * | 8/2005 | Burcham | B05B 3/0486 239/222.11 |
| 2006/0038036 A1 * | 2/2006 | Perkins | B05B 3/0486 239/222.17 |
| 2007/0040045 A1 * | 2/2007 | Cohen | F16C 17/08 239/222.17 |

FOREIGN PATENT DOCUMENTS

IT   WO2010/010534   *   1/2010   ............ B05B 3/04

* cited by examiner

*Primary Examiner* — Arthur O Hall
*Assistant Examiner* — Chee-Chong Lee
(74) *Attorney, Agent, or Firm* — Themis Law

(57) ABSTRACT

A liquid diffuser device for irrigation systems includes a support structure defining a first longitudinal axis with an upper passageway for a liquid jet and a lower tubular body having a bottom wall, a spherical member associated therewith having an outer surface with a predetermined average radius of curvature, a liquid jet deflecting member having an upper plate and a lower stem designed to be introduced into the tubular body and defining a second longitudinal axis. The stem interacts with the outer surface of the spherical member, to allow rotation of the stem relative to the body and nutation of the second axis relative to the first axis. The bottom surface is concave to define with the spherical member a relatively broad and substantially uniform contact surface, to reduce the local specific pressure, thereby decreasing friction, wear and vibrations on the stem and the spherical member during operation.

9 Claims, 5 Drawing Sheets

LIQUID DIFFUSER DEVICE FOR IRRIGATION SYSTEMS

FIELD OF THE INVENTION

The present invention generally finds application in the field of irrigation systems for agricultural and industrial applications, and particularly relates to a liquid diffuser device for irrigation systems.

BACKGROUND ART

Some prior art agricultural and/or industrial irrigation systems comprise an irrigation liquid supply conduit, connected to a plurality of drop lines, each having a diffuser device for uniformly distributing a liquid jet to an underlying soil portion to be irrigated.

A diffuser device typically comprises a main body with a tubular passage having one end connected to the drop line and the opposite end having a nozzle for delivery of a downward liquid jet.

Furthermore, the device comprises a deflector member for obstructing and radially deflecting the liquid jet that flows out of the tubular passageway, for uniform distribution thereof over the soil portion to be irrigated.

The deflector member generally comprises a stem, which is designed to be introduced into the tubular body and has one plate-like end before the nozzle for interacting with and diffusing the liquid jet delivered thereby.

The deflector member is typically removably coupled to the tubular body to allow rotation of the stem and the plate relative to a vertical axis, due to the pressure exerted by the jet.

VI2008A000175, in the name of the Applicant hereof, discloses a liquid diffuser device for irrigation systems as described hereinbefore which has means for supporting the stem with the bottom wall of the tubular body.

These means are equipped with an intermediate contact member integral with the lower end of the stem and adapted to continuously contact the bottom wall of the tubular body to prevent downward translation of the stem, caused by wear of the contact surfaces and to maintain the distance of the plate from the nozzle unchanged.

Furthermore, the bottom wall of the tubular body may have a first concave seat for accommodating a first sphere and the end bottom surface of the stem may have a second concave seat for receiving therein a second sphere defining the intermediate member.

The second sphere has a smaller diameter as compared with the first sphere, for rotation of the stem relative to the bottom wall and oscillation thereof relative to the vertical axis of the tubular body, resulting in nutation of the plate relative to said axis.

A first drawback of this arrangement is that its construction and assembly are rather complex and it has a relatively high cost.

This is because the second sphere must be manually inserted into the corresponding concave seat formed in the bottom surface of the stem, which is a time consuming operation, requiring remarkable manual dexterity of the assembly operator.

A further drawback of this known arrangement is that the provision of the intermediate member only partially reduces stem wear, and the resulting efficiency loss in the device.

Indeed, the nutation of the plate causes the side wall of the concave seat to wear, and may generate oscillatory vibrations of the plate, with the risk of causing the device to break or blocking the movement of the stem, which will prevent uniform distribution of the liquid jet on the soil portion to be irrigated.

Also, a further drawback of this solution is that, due to the wear of the seat, the diffuser member is required to be periodically replaced, which will increase the maintenance costs of the system.

Furthermore, during periodic maintenance of the diffuser device, the operation of the system is stopped, and the soil remains unirrigated for a given time, which will reduce the growth of crops or irremediably cause their destruction.

SUMMARY OF THE INVENTION

The object of the present invention is to overcome the above drawbacks, by providing a liquid diffuser device for irrigation systems that is highly efficient and relatively cost-effective.

A particular object of the present invention is to provide a liquid diffuser device for irrigation systems that has a simple structure.

Another object of the present invention is to provide a liquid diffuser device for irrigation systems that can be assembled in a remarkably short time.

Yet another object of the present invention is to provide a liquid diffuser device for irrigation systems that has a remarkably long life.

A further object of the present invention is to provide a liquid diffuser device for irrigation systems that requires no maintenance and reduces or eliminates irrigation system downtime.

These and other objects, as better explained hereafter, are fulfilled by a liquid diffuser device for irrigation systems as defined in claim 1, which comprises a support structure defining a first longitudinal axis with an upper passageway for a liquid jet and a lower tubular body having a substantially transverse bottom wall, a spherical member associated with said bottom wall and having an outer surface with a predetermined average radius of curvature and a liquid jet deflecting member comprising an upper plate located at a predetermined distance from said passageway and a lower stem which is designed to be introduced into said tubular body and defines a second longitudinal axis.

The stem has an end with a bottom surface designed to interact with the outer surface of said spherical member to allow rotation of said stem relative to said tubular body and nutation of said second axis relative to said first axis.

The device is characterized in that the bottom surface of the stem proximate to said second axis is concave and comprises a first portion with a first radius of curvature substantially equal to the average radius of curvature of the spherical member to define therewith a relatively broad and uniform mutual contact surface thereby reducing specific pressure, wear and vibrations between said stem and said spherical member during operation.

This combination of features will reduce specific pressure, wear and vibrations between said stem and the spherical member during operation of the device.

Advantageous embodiments of the invention are obtained in accordance with the dependent claims.

BRIEF DESCRIPTION OF THE DRAWINGS

Further features and advantages of the invention will become more apparent upon reading the following detailed description of a few preferred non-exclusive embodiments of a liquid diffuser device for irrigation systems, which is described by way of a non-limiting example with the help of the accompanying drawings in which.

DETAILED DESCRIPTION OF EMBODIMENTS OF THE INVENTION

Figure 1:
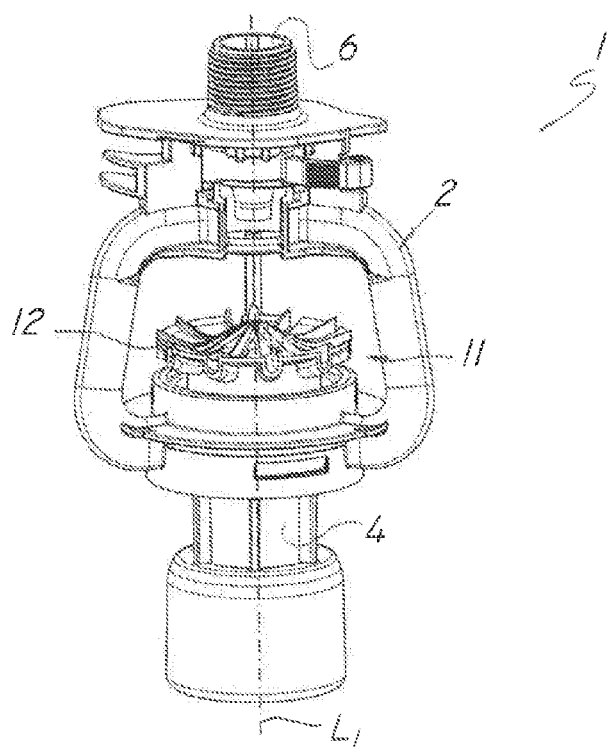
FIG. 1 is a perspective view of a liquid diffuser of the invention according to a first configuration.

FIG. 1 shows a diffuser device for irrigation systems according to the invention, generally designated with numeral 1, which is designed for distribution of an irrigation liquid, generally water, over a soil to be irrigated.

Particularly, the diffuser may be connected to a water supply conduit via a drop line to form "center pivot" irrigation systems or the like.

As better shown in the figures, the diffuser device comprises a support structure 2 defining a first longitudinal axis $L_1$ with an upper passageway 3 for a liquid jet and a lower tubular body 4 having a substantially transverse bottom wall 5.

As is known in the art, the support structure 2 may be connected to the irrigation system via the inlet 6 of the upper passageway 3.

Furthermore, a nozzle 8 may be fixedly or removably fitted at the outlet 7 of the upper passageway, for directing the liquid jet in a longitudinal direction, generally downwards.

Figure 2:
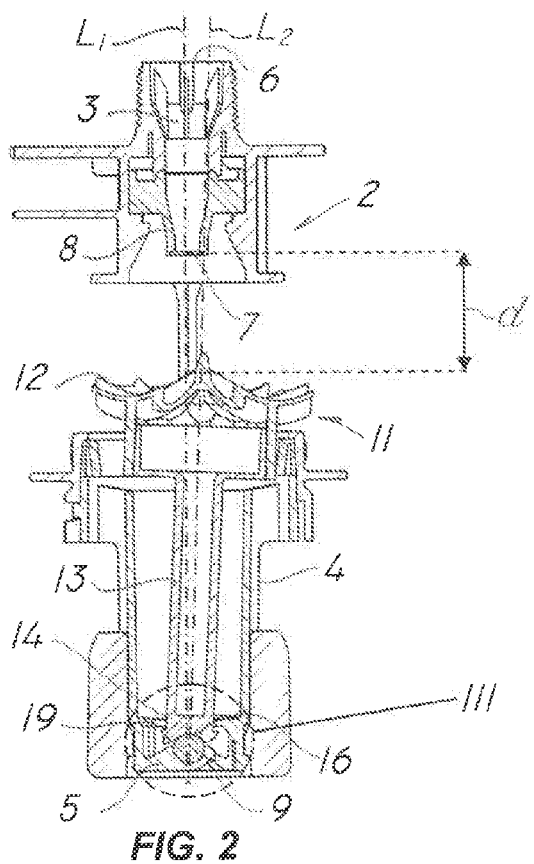
FIG. 2 is a sectional side view of the diffuser of FIG. 1.

As best shown in FIG. 2, the device is equipped with a spherical member 9, associated with the bottom wall 5, which has an outer surface 10 with a predetermined average radius of curvature $R_M$, and with a jet deflecting member 11 comprising an upper plate 12 and an underlying stem 13 which is designed to be introduced into the tubular body 4 and defines a second longitudinal axis $L_2$.

Particularly, the stem 13 may have a substantially cylindrical shape and the plate 12 may be placed at the predetermined distance d from the nozzle 8 or, alternatively, from the outlet 7 of the upper passageway 3.

Conveniently, the stem 13 may have an end 14 with a bottom surface 15 designed to interact with the outer surface 10 of the spherical member 9 associated with the bottom wall 5, to allow rotation of the stem 13 relative to the tubular body 4 as well as nutation of the second axis $L_2$ relative to the first axis $L_1$ of the support structure 2.

The rotation of the stem 13 and the nutation of the second axis $L_2$ are caused by the pressure exerted on the plate 12 by the liquid jet delivered through the upper passageway 3.

According to a peculiar feature of the invention, the bottom surface 15 of the stem 13 is at least partially concave proximate to second axis $L_2$ and comprises a first portion 16 with a first radius of curvature $R_1$ substantially equal to the average radius of curvature $R_M$ of the outer surface 10 of the spherical member 9.

This geometry creates a relatively broad and substantially uniform contact area 17 between the outer surface 10 of the spherical member 9 and the bottom surface 15 of the stem 13. Therefore, a relatively low specific pressure exists between the outer surface 10 of the spherical member 9 and the portion 16 of the bottom surface 15, i.e. lower than the one that would exist if the surface of the bottom of the stem were flat or convex, like in the application no. VI2008A000175 by the Applicant hereof, which will reduce wear and especially vibrations during operation of the device.

In the illustrated embodiments of the invention, the spherical member 9 associated with the bottom wall 5 of the tubular body 4 is a sphere 9 whose radius is equal to the average radius of curvature $R_M$.

Preferably, the sphere 9 may have a diameter ($2 \times R_M$) ranging from 5 mm to 11 mm, and preferably of about 8 mm.

Alternatively, the diffuser device 1 may comprise spherical members 9 other than a sphere, such as a hemisphere or a spherical cap, which are obtained either by appropriately forming or molding the bottom wall 5 or by mounting an insert in the tubular body 4.

For example, the sphere 9 may be held in a seat 18 whose shape is complementary to that of the bottom wall 4 and whose diameter is slightly greater than the diameter of the sphere 9, for free rotation of the latter upon contact between the outer surface 10 and the first portion 16 of the bottom surface 15 of the stem 13.

Conveniently, as best shown in FIGS. 2 to 10, the bottom surface of the stem 13 may have a second surface portion 19, at the periphery of the first portion 15, and have a second radius of curvature $R_2$ greater than the first radius of curvature $R_1$.

Due to this greater radius of curvature, the second portion 19 will not contact the outer surface 10 of the spherical member 9 during rotation of the stem 13 and nutation of the second axis $L_2$ relative to the first axis $L_1$.

The second surface portion 19 is joined to the first portion 16 by a circular connection line 20 which is centered on the second axis $L_2$ and extends to the peripheral edge 21 of the bottom surface 15.

A difference between the second radius of curvature $R_2$ and the first radius of curvature $R_1$ ranging from 0.1 mm to 1 mm and preferably of about 0.4 mm ensures satisfactory operation of the device.

Figure 4:
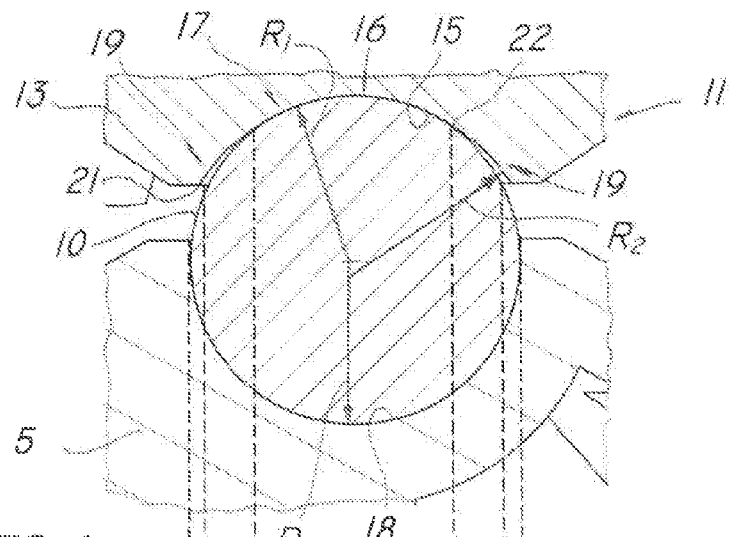
FIG. 4 is an enlarged view of a second detail of FIG. 3.
Figure 5:
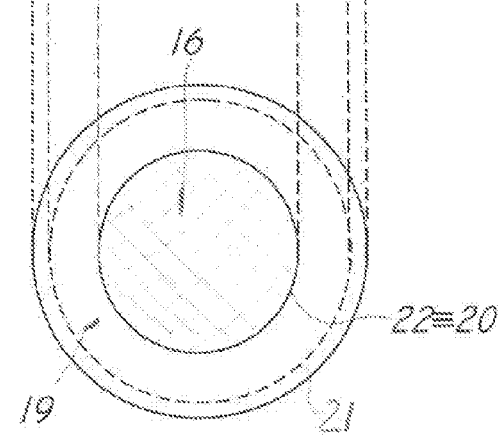
FIG. 5 is a plan view of the sphere and the contact area as shown FIG. 4.

Conveniently, in a first embodiment of the invention, as shown in FIGS. 4 and 5, the first portion 16 has a substantially circular plan shape, with an outer margin 22 substantially corresponding to the connection line 20 connecting with the second surface portion 19.

Preferably, the ratio of the diameter of the spherical member 9 to the diameter D of the outer margin 22 may range from 0.2 to 0.78, and is preferably about 0.6.

In an alternative configuration of the invention, as shown in FIGS. 7 to 11, the stem 13 may comprise a substantially cylindrical central cavity 23 which is centered on the second axis $L_2$ and has a substantially dome-shaped end 24.

Furthermore, the cavity 23 may comprise a circular bottom edge 25 at the bottom surface 15 of the stem 13.

The edge 25 of the cavity 23 may contact the outer surface 10 of the spherical member 9 to facilitate centering of the stem 13 relative to the tubular body 4 and reduce vibrations during operation of the device 1.

Preferably, the cavity 23 may have a diameter ranging from 1 mm to 5 mm, and preferably of about 3 mm.

Conveniently, as best shown in FIGS. 8 to 11, the first surface portion 16 is situated at the periphery of the bottom edge 25 of the cavity 23 and may comprise an inner margin 26 substantially corresponding to such bottom edge 25.

Figure 9:
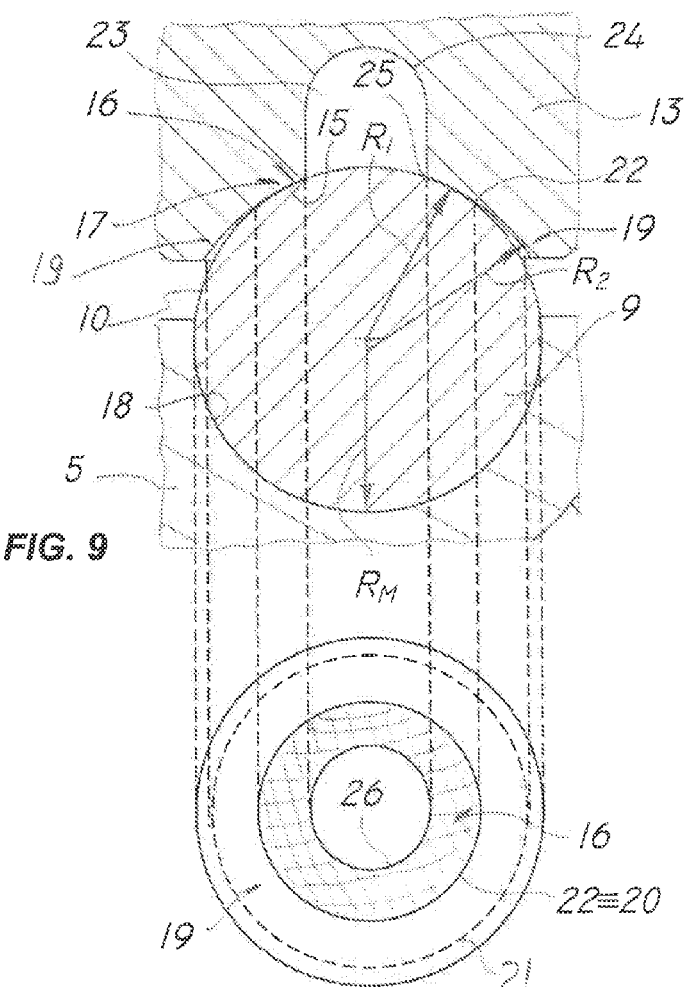
FIG. 9 is an enlarged view of a fourth detail of FIG. 8.
Figure 10:
FIG. 10 is a detailed view of FIG. 9.

Thus, as shown in FIGS. 9 and 10, the first portion 16 may have a substantially annular plan shape, and the outer margin 22 may substantially correspond to the connection line 20 between the first portion 16 and the second portion 19.

Advantageously, the spherical member 9 may be formed from a high-resistance base material, for reducing wear of the outer surface 10 thereof.

This base material may be selected in view of minimizing wear between the outer surface 10 and the bottom surface 15 of the stem 13 when they contact each other.

Preferably, the spherical member 9 may be made of a base material selected from the group comprising ceramic materials or the like.

Furthermore, the end 14 of the stem 13 may be made of a polymeric material.

Particularly, the bottom surface 15 of the stem 13 may be made of a low-wear smooth polymeric material, for further minimizing its friction coefficient relative to the spherical member 9.

Preferably, the end 14 of the stem 13 may be made of a polymeric material selected from the group comprising fiber-filled thermoplastic materials.

The support structure 2 and the tubular body 4 may be made of a thermoplastic polymeric material of the same type as the material of the stem 13 or of different type.

Figure 3:
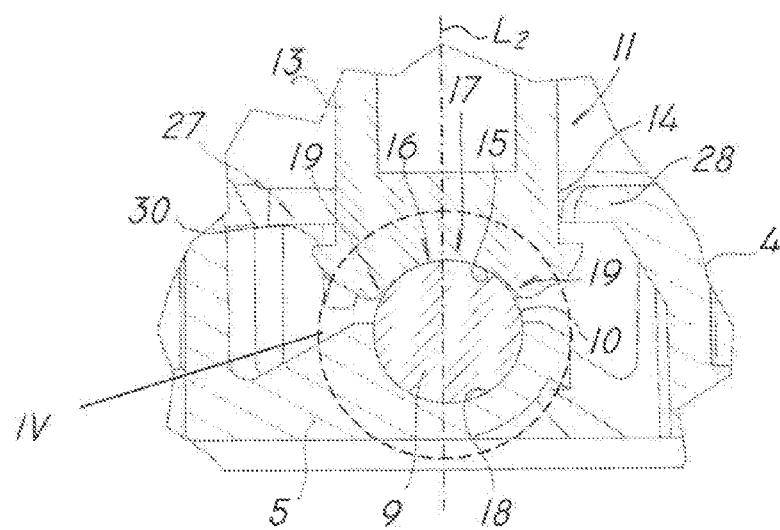
FIG. 3 is an enlarged view of a first detail of FIG. 2.
Figure 6:
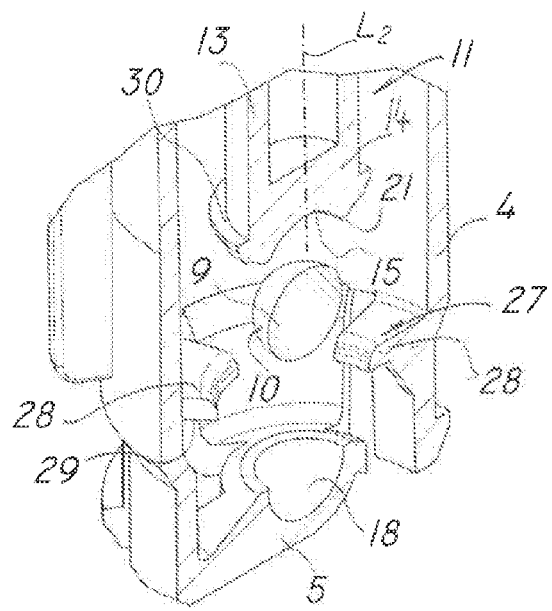
FIG. 6 is an exploded perspective view of FIG. 3.
Figure 7:
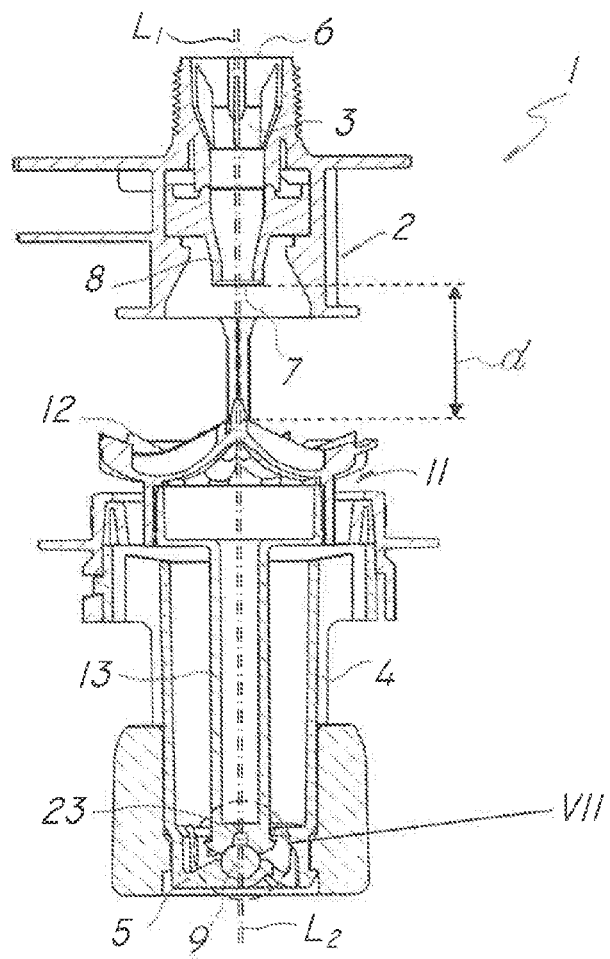
FIG. 7 is a side sectional view of a diffuser of the invention according to a second configuration.
Figure 8:
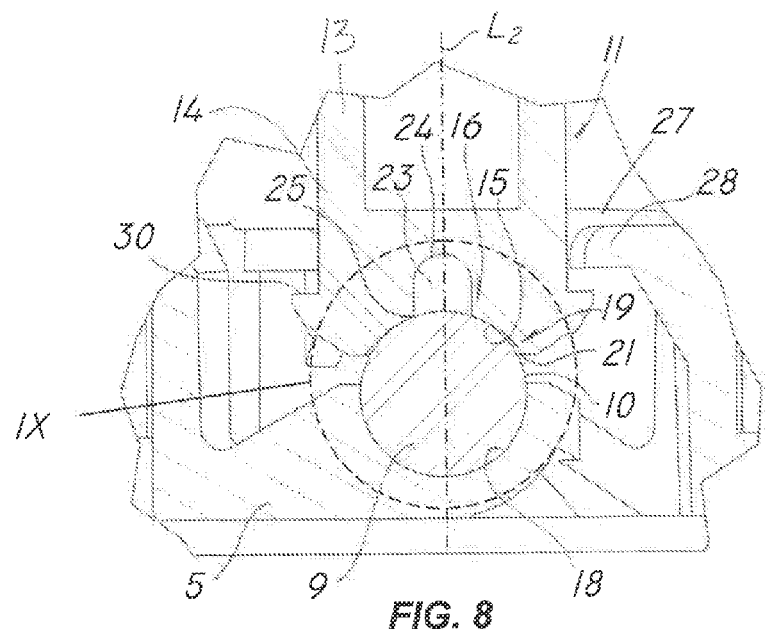
FIG. 8 is an enlarged view of a third detail of FIG. 7.
Figure 11:
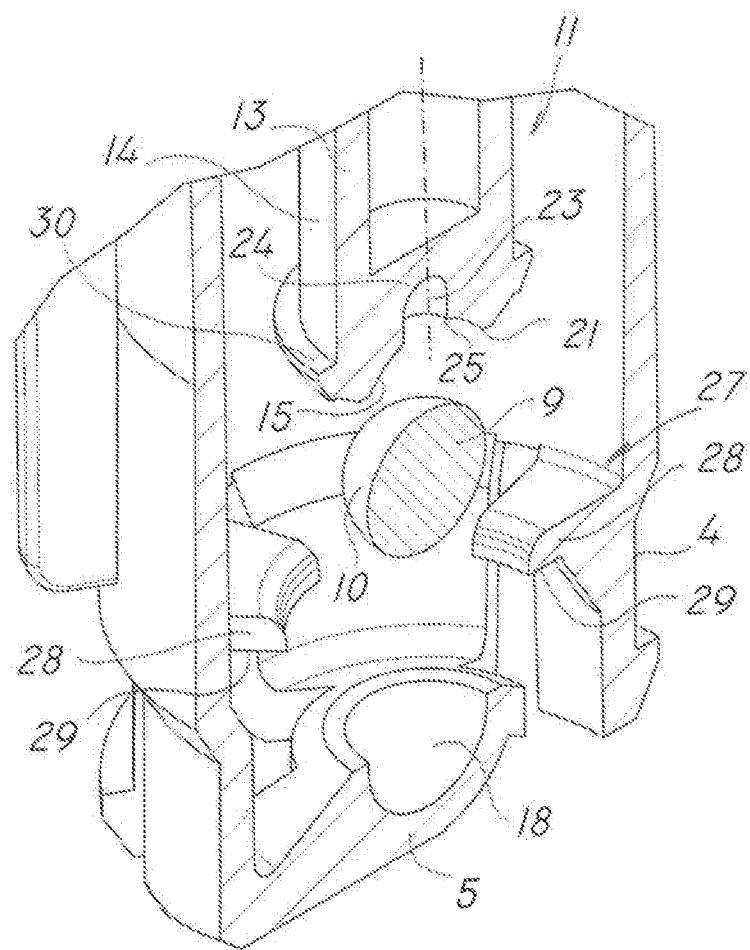
FIG. 11 is an exploded perspective view of FIG. 8.

Conveniently, as best shown in the enlarged views of FIGS. 3 and 6 and of FIGS. 8 and 11, the diffuser device 1 may comprise retaining means 27 for holding the stem 13 in a substantially axial direction relative to the tubular body 4.

Particularly, the retaining means 27 may comprise a plurality of inwardly projecting abutment members 28, integral with the bottom wall 5 of the tubular body 4.

Each abutment member 28 may comprise a first substantially radial edge 29 and the end 14 of the stem 13 may comprise a second substantially radial edge 30 facing the first radial edge 29.

The first radial edge 29 and the second radial edge 30 are adapted to interact with each other when the stem 13 is moved upwards, to limit the axial stroke of the latter and prevent it from being withdrawn from the tubular body 4 along the first longitudinal axis $L_1$.

The above disclosure clearly shows that the liquid diffuser device of the invention fulfils the intended objects and particularly meets the requirements of being easy to manufacture, of reducing friction and vibrations on the stem during operation of the system, and of having a longer life as compared with currently available diffuser devices.

The device of the invention is susceptible to a number of changes and variants, within the inventive concept disclosed in the appended claims. All the details thereof may be replaced by other technically equivalent parts, and the materials may vary depending on different needs, without departure from the scope of the invention.

While the device has been described with particular reference to the accompanying figures, the numerals are only used for the sake of a better intelligibility of the invention and shall not be intended to limit the claimed scope in any manner.

INDUSTRIAL APPLICABILITY

The present invention finds application in the field of irrigation systems, particularly in the manufacture of liquid diffuser devices for irrigation of predetermined soil surfaces.

The invention claimed is:

1. A liquid diffuser device for irrigation systems, comprising:
   a support structure defining a first longitudinal axis with an upper passageway for a liquid jet and a lower tubular body having a substantially transverse bottom wall;
   a spherical member associated with said bottom wall and having an outer surface with a predetermined average radius of curvature;
   a deflector member for the liquid jet comprising an upper plate located at a predetermined distance from said upper passageway; and
   a lower stem designed to be introduced into said tubular body and defining a second longitudinal axis,
   wherein said stem has an end with a bottom surface designed to interact with the outer surface of said spherical member to allow rotation of said stem relative to said tubular body and nutation of said second axis relative to said first axis,
   wherein the bottom surface of said stem proximate to said second axis is concave and comprises a first concave surface portion with a first radius of curvature substantially equal to the average radius of curvature of said spherical member to define therewith a relatively broad and substantially uniform mutual contact surface, thereby reducing specific pressure, wear and vibrations between said stem and said spherical member during operation, and
   wherein said bottom surface further defines a second concave surface portion at an outer periphery of the first surface portion, being connected to said first concave portion by a substantially continuous connection line, said second concave surface portion having a second radius of curvature larger than said first radius to prevent rubbing contact of said second concave surface portion with the outer surface of said spherical member.

2. The liquid diffuser device as claimed in claim 1, wherein the difference between said second radius of curvature and said first radius of curvature ranges from 0.1 mm to 1 mm.

3. The liquid diffuser device as claimed in claim 1, wherein said first surface portion has a substantially circular plan shape with an outer margin substantially corresponding to said connection line.

4. The liquid diffuser device as claimed in claim 1, wherein said first surface portion has a substantially annular plan shape with a substantially circular inner margin, said stem having a central cavity with a bottom edge that defines said inner margin, at said bottom surface.

5. The liquid diffuser device as claimed in claim 4, wherein said central cavity is substantially dome-shaped centered on said second axis.

6. The liquid diffuser device as claimed in claim 1, wherein said spherical member is made of a high-resistance base material selected from the group consisting of ceramic materials.

7. The liquid diffuser device as claimed in claim 6, wherein said spherical member is a sphere whose radius is equal to said average radius of curvature.

8. The liquid diffuser device as claimed in claim 1, wherein said end of said stem is made of a high-resistance polymeric material selected from the group consisting of fiber-filled thermoplastic materials.

9. The liquid diffuser device as claimed in claim 1, wherein said bottom wall of said tubular body has a seat for housing said sphere, whose shape is substantially complementary to the shape of the sphere.

* * * * *